United States Patent [19]

Smith

[11] 3,882,472

[45] May 6, 1975

[54] DATA FLOW CONTROL IN MEMORY HAVING TWO DEVICE MEMORY CELLS

[75] Inventor: Kent F. Smith, Salt Lake City, Utah

[73] Assignee: General Instrument Corporation, Clifton, N.Y.

[22] Filed: May 30, 1974

[21] Appl. No.: 474,391

[52] U.S. Cl.. 340/173 CA; 340/173 R; 340/173 DR

[51] Int. Cl.... G11c 11/24; G11c 11/40; G11c 7/00

[58] Field of Search... 340/173 CA, 173 R, 173 DR; 307/238

[56] References Cited

UNITED STATES PATENTS 3,646,525 2/1972 Linton et al. .................. 340/173 CA 3,706,079 12/1972 Vadasz et al. ................ 340/173 CA

*Primary Examiner*—Stuart N. Hecker

[57] ABSTRACT

Method and apparatus for controlling data flow in a memory comprised of a two device memory cell wherein the devices in the cell are connected through a storage node. A first command line is operably connected to the control terminal of the first device in the cell and the output circuit of the first device is connected between a data input-output line and the storage node. The second device in the cell has its output circuit connected between the data line and a second command line and its control terminal connected to the storage node. The storage node is charged to one of two discrete logic levels. To perform a read operation, the data line is precharged to a first voltage level and the second command line is precharged to a first voltage voltage level. The second device in the cell is effective, if rendered conductive by the charge on the storage node, to change the voltage level of the data line to the second voltage level such that the resulting voltage level on the data line is representative of the charge on the storage node, and therefore the data in the cell, which may then be read. In order to write data into the cell, the data line is charged to a voltage level representative of the data to be stored (which may be the resulting voltage if refreshing is to take place) and the first command line is charged to a first voltage level such that the first device is rendered conductive to charge the storage node to the voltage level present on the data line. A combination of a read cycle and a write cycle refreshes the cell without the necessity of a refresh amplifier.

20 Claims, 5 Drawing Figures

DATA FLOW CONTROL IN MEMORY HAVING TWO DEVICE MEMORY CELLS

The present invention relates to random access memories and more particularly to method and apparatus for controlling the data flow in a dynamic random access memory comprised of two device memory cells.

A random access memory is a device which is capable of storing a plurality of bits of information or data, a single bit of information being stored on each memory cell in the memory. The information bits are stored on each memory cell in various ways such as charging a storage node to one of two discrete logic levels or the presence or absence of an operative switching device. Normally, the memory cells in a memory are arranged in a row and column matrix with the appropriate address circuitry provided such that any particular cell in the matrix may be addressed to read information therefrom or to write information therein.

In a broad sense, random access memories can be divided into two basic categories, static and dynamic. Static random access memories are characterized in that the information stored thereon is permanent and therefore may be maintained thereon without periodic renewal or refreshing of the storage portion of the cell. On the other hand, dynamic random access memories store data in a nonpermanent manner. In these memories, the information is normally stored by means of the charging of a storage node to a given discrete voltage level representative of the data. Since the charge on a node, such as one plate of a capacitor, will decay after a given time (the decay time being determined by the physical properties of the storage facility) it is necessary that the charge on the storage node of each cell in a dynamic random access memory be periodically refreshed in order to retain the information stored thereon. This is normally accomplished through a series of refresh amplifiers which are periodically connected to each cell in the memory to reinforce the charge on the storage nodes. Often, a refresh amplifier is provided for each column of cells in the memory and each refresh amplifier is activated to refresh the data on each cell in the associated column sequentially.

A variety of different types of memory cells have been utilized in random access memories. Some of these cells have a single switching device in the form of a field effect transistor. Others have two, three or more switching devices in each memory cell. Whatever the particular configuration of memory cell used, a number of conductors are necessary to carry command signals to address a particular cell and data input and data output signals between the addressed cell and other parts of the memory. Generally, since the memory cells are arranged in a row and column matrix, certain of these conductors run along each row of the matrix and certain other of these conductors run down each column of the matrix.

The capacity of a memory is a measurement of how many information bits may be stored therein and therefore how many memory cells are present per unit area. In this age of miniaturization, it is desirable that a memory have as large a capacity as possible. Aside from the peripheral circuitry, the capacity of a memory is dependent upon the size of individual memory cells, the number of conductors necessary and the size and number of refresh amplifiers needed, all of which take up space in the memory.

It is, therefore, a prime object of the present invention to provide a method and apparatus for controlling data flow in a dynamic random access memory comprised of two device memory cells which eliminates the necessity for refresh amplifiers, thereby reducing the complexity of the memory and enhancing the capacity thereof.

It is another object of the present invention to provide method and apparatus for controlling data flow in a dynamic random access memory comprising two device memory cells wherein only three conductors are connected to each cell, thereby minimizing the overall number of conductors and enhancing the capacity of the memory.

In accordance with the present invention, method and apparatus for controlling data flow in a dynamic random access memory comprised of two device memory cells are provided. A first command line is operably connected to the control terminal of the first device in the cell. The output circuit of the first device is connected between a data input-output line and a storage node. The second device has its output circuit connected between the data line and a second command line and its control terminal connected to the storage node. The storage node is charged to one of two discrete logic levels. In order to perform a read operation, the data line is precharged to a first voltage level and the second command line is charged to a second voltage level. The second device is then effective, if rendered conductive by the charge on the storage node, to change the voltage level of the data line to the second voltage level such that the resulting voltage level on the data line is representative of the charge on the storage node, and therefore the data on the cell, which may then be read.

In order to write data into the cell, the data line is charged to a voltage level representative of the data to be stored into the cell. This voltage level may be the resulting voltage in the case of a refresh operation. The first command line is then charged to the first voltage level such that the first device is rendered conductive to charge the storage node to the voltage level present on the data line.

The refresh function is thus accomplished without a refresh amplifier by performing a read operation, retaining the resulting voltage level on the data line and then performing a write operation. This significantly enhances the capacity of the memory by eliminating the necessity for refresh amplifiers.

After a read operation, the resulting voltage level on the data line is representative of the inverse of the logic level present on the storage node of the memory cell. Because the data line is precharged prior to each read operation, the resulting voltage level on the data line is at the maximum voltage representative of the inverse of the stored logic level at the start of each read operation. Therefore, when the data line is connected to the storage node during a write operation, the logic level is not only inverted but the storage node is recharged to the maximum voltage level. As long as a read-write cycle occurs for each cell perodically, this serves to refresh the information on the storage node and no additional refresh components are necessary.

Further, the system of the present invention accomplishes read, write and refresh cycles through the use of only three conductor connections per cell. Thus in a memory comprised of a matrix of MXN cells, only M+2N conductors are necessary, thereby minimizing the amount of space needed on the chip for conductors and maximizing the capacity of the memory.

To the accomplishment of the above and to such other aspects as may hereinafter appear, the present invention relates to method and apparatus for controlling data flow in a dynamic random access memory comprised of two device memory cells as defined in the appended claims and as described in the specification, taken together with the accompanying drawings wherein:

Figure 1:
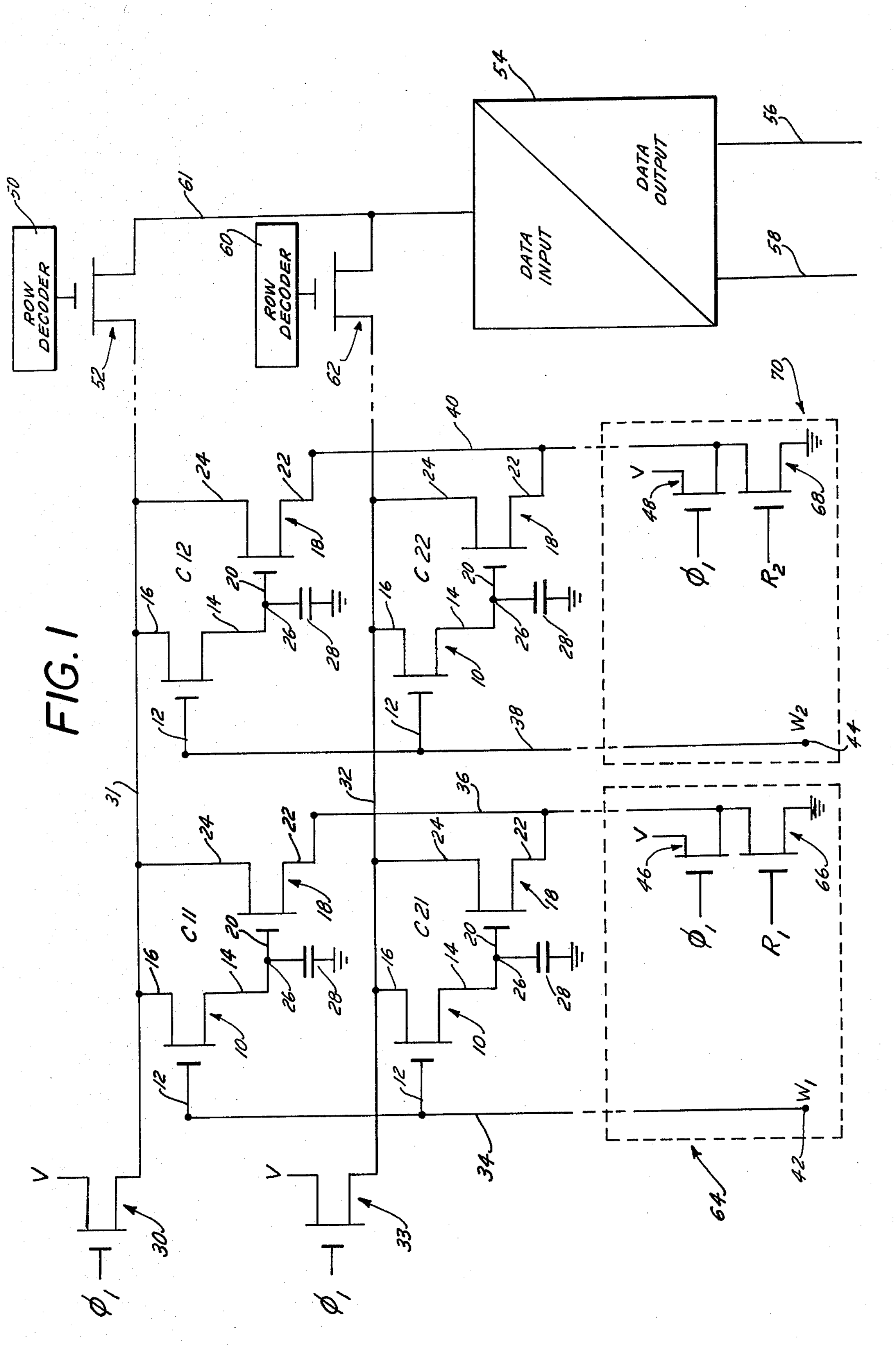
FIG. 1 shows a four-bit dynamic random access memory utilizing the data flow control system of the present invention.

FIG. 1 shows a dynamic random access memory comprised of four memory cells in a row and column matrix array. Each cell is designated $C_{x,y}$ wherein the first and second subscripts indicate the row and column respectively in which the cell is situated. Each cell comprises two semiconductor switching devices, each of which is preferably in the form of a metal oxide semiconductor field effect transistor. The first device 10 has a control terminal 12 and an output circuit defined by source and drain terminals 14 and 16 respectively. The second switching device 18 has a control terminal 20 and an output circuit defined by source and drain terminals 22 and 24 respectively. A storage node 26 is connected between source 14 of transistor 10 and control terminal 20 of transistor 18. A capacitor 28 (which may be an inherent capacitance rather than a discrete circuit component) is connected between storage node 26 and ground.

Figures 2A, 2B, 2C:
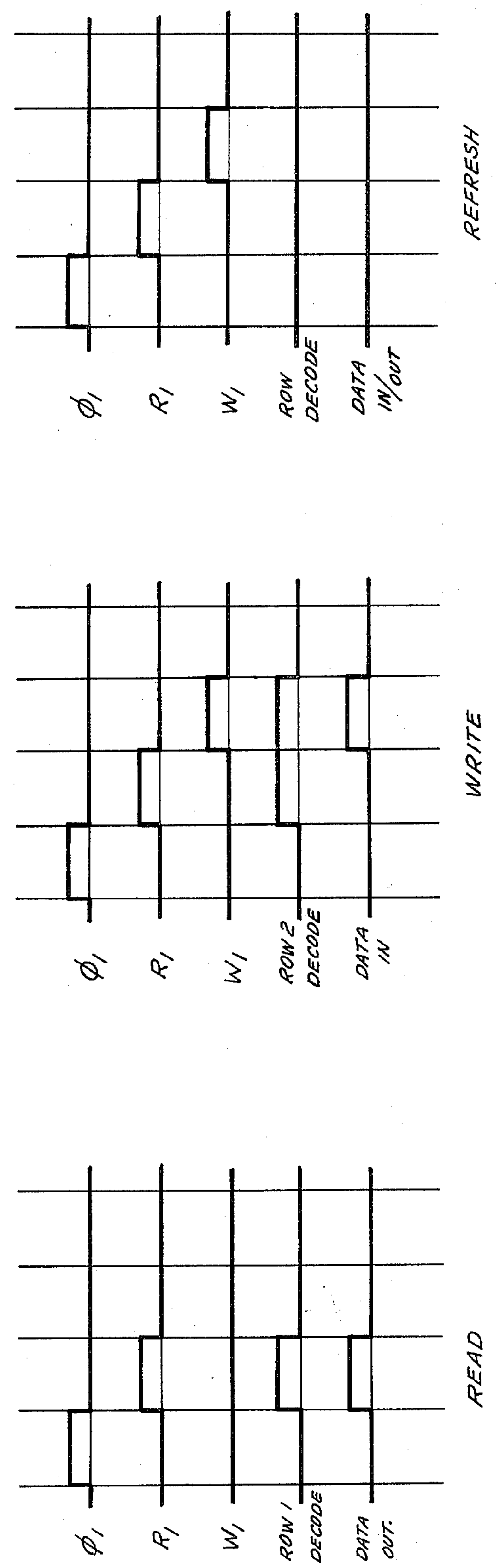
FIGS. 2A, 2B and 2C show graphic representations of the voltage levels of each conductor during read, write, and refresh cycles respectively.

Two rows and two columns of memory cells are shown. A data input-output line is provided for each row. Data line 31 of row 1 is connected to source V through transistor 30. In a similar manner, data line 32 associated with row 2 is connected to source V throught transistor 33. Each column has a write line and a read line associated therewith. The write line of column 1 is designated 34 and the read line of column 1 is designated 36. In a similar manner, the write line of column 2 is designated 38 and the read line of column 2 is designated 40. The write lines 34 and 38 are connected to nodes 42 and 44 respectively, which are in turn connected to receive the write command signal. Read lines 36 and 40 are connected to source V by means of transistors 46 and 48 respectively. Transistors 30 and 33 which connect data lines 31 and 32 respectively to source V and transistors 46 and 48 which connect read lines 36 and 40 respectively to source V have control terminals which are connected to receive a clocked signal designated $\phi_1$ and therefore will be conductive during the time when the $\phi_1$ signal is positive (see FIG. 2).

A row decoder is associated with each row of memory cells and a column decoder with each column. Row decoder 50 is associated with row 1 and operates a transistor 52 to connect data line 31 to a data input-output buffer 54 which in turn is operably connected to a data output line 56 and a data input line 58. In a similar manner, row decoder 60 is associated with data line 32 and operates a transistor 62 to operably connect data input-output line 32 with the input-output buffer 54.

A column decoder, generally designated 64, is associated with column 1. This column decoder comprises node 42 which receives the write command signal $W_1$, transistor 46 which connects read line 36 to source V during $\phi_1$ time and transistor 66 which becomes conductive to connect read line 36 to ground upon receipt of the appropriate read command signal $R_1$. In a similar manner, a column decoder, generally designated 70, is associated with column 2. Column decoder 70 comprises node 44 which receives write command signal $W_2$, transistor 48 which, when conductive during $\phi_1$ time, connects read line 40 to source V and transistor 68 which, then rendered conductive by read command signal $R_2$, connects read line 40 to ground.

In operation, a read cycle (see FIG. 2A) is performed by first precharging each of the data input-output lines 31, 32 and read lines 36, 40 with a positive charge. This is accomplished during $\phi_1$ time wherein the $\phi_1$ positive signal is fed to the control terminal of transistors 30, 33, 46 and 48, thereby connecting lines 31, 32, 36 and 40 to source V. After a time sufficient to charge each of these lines to the required positive voltage, and $\phi_1$ signal terminates thus rendering transistors 30, 33, 46 and 48 nonconductive such that the positive precharge remains on lines 31, 32 36 and 40. By way of example, assume that the data already contained within cell $C_{1,1}$ is to be read. Thus, column 1 is to be considered the addressed column and row 1 the addressed row. Column decoder 64 receives a read signal $R_1$ which causes transistor 66 to become conductive thereby discharging read line 36 to ground. The grounding of read line 36 causes a potential difference between the source terminal 22 and drain terminal 24 of the transistor 18 in each cell in the addressed column. This potential difference between the source and drain of each transistor 18 is sufficient to cause each of the transistors 18 to be conductive, if, and only if, a positive charge is present on the storage node 26 associated therewith. Assume that the charge on storage node 26 of cell $C_{1,1}$ is positive and the charge on storage node 26 of cell $C_{2,1}$ is zero. After read line 36 goes to ground, the positive charge on storage node 26 of cell $C_{1,1}$ will cause transistor 18 of this cell to be conductive, thereby causing data input-output line 31 to be operably connected to read line 36 to discharge data input-output line 31. On the other hand, since storage node 26 of cell $C_{2,1}$ is at zero potential, the transistor 18 of cell $C_{2,1}$ is not rendered conductive and data input-output line 32 remains at the positive potential. At this point, it can be seen that the resulting voltage level on each of the data input-output lines is representative of the data level at the storage node of the cell in the addressed column which is present in that row. In fact, the resulting voltage level is the inverse of the data level present on the storage node of the adjacent cell. For cell $C_{2,1}$, whose storage node is at zero potential, the resulting voltage is positive, and for cell $C_{1,1}$, whose storage node is at positive potential, the resulting voltage is zero.

Since it is desired to read out the data which is on cell $C_{1,1}$, row decoder 50 for row 1 is acuated to render transistor 52 conductive. Rendering transistor 52 conductive operably connects data input-output line 31 to a line 61 and thus to input-output buffer 54. Buffer 54 receives the resulting voltage level from data line 31 which is the inverted version of the data which is contained on storage node 26 of cell $C_{1,1}$ (i.e., the resulting voltage on line 31 from cell $C_{1,1}$). This inverted data is once again inverted in buffer 54 (if necessary), in a manner which is described in detail below, and then connected to output line 56. After the inverted data has been received at buffer 54, row decoder 50 is deactuated and transistor 52 once again becomes nonconductive, thereby preserving the resulting voltage level on data input-output line 31.

In row 2 data line 32 has thereon the inverted version of the data present on the storage node of cell $C_{2,1}$. This data is in the form of the resulting voltage level. Since row decoder 60 is not activated, transistor 62 is kept non-conductive, and the resulting voltage on data line 32 is retained thereon.

Each time a write cycle is to be performed, a read cycle, as described above, must precede it (with the exception that the data need not have been read out). (See FIG. 2B.) Thus, previous to a write cycle, all of the data lines have the resulting voltage present thereon. Assuming the status of the memory as described in the previously described read cycle, assume that it is desired to write a zero data signal into cell $C_{2,1}$. The data to be written on the addressed cell (zero voltage) appears on data input line 58 and, if necessary, is inverted in input-output buffer 54 for the reasons and in a manner described below, and appears on line 61. Let us assume it is not inverted, and remains zero. Row decoder 60 is actuated to render transistor 62 conductive such that data input-output line 32 receives the zero data signal from line 61. A positive write signal ($W_1$) appears at node 42 in column decoder 64 such that write line 34 becomes positive. The positive voltage level of write line 34 causes the transistor 10 of each cell in the addressed column to become conductive. The conductivity of transistor 10 causes storage node 26 to assume the data level of the data input-output line associated with that cell. Therefore, storage node 26 of cell $C_{2,1}$ will become zero because of the zero voltage level present on data input-output line 32. In a similar manner, storage node 26 of cell $C_{1,1}$ will assume the resulting voltage level of data line 31. This voltage level is determined by the stored data on cell $C_{1,1}$ during the previous read cycle. After a time sufficient to charge the storage nodes to the appropriate voltage level, the write signal $W_1$ terminates and write line 34 returns to ground rendering nonconductive each transistor 10 in the addressed column.

A fresh cycle (see FIG. 2C) is accomplished by a read cycle followed by a write cycle wherein no new data is written into the cells. During the read cycle ($\phi_1$ time) the data lines are precharged. After the read signal $R_Y$, the resulting voltage on each line is the reinforced inverse of the data on the storage node of the cell associated with that data line in the addressed column. The write signal $W_Y$ causes the resulting voltage level present on each data line (which is the inverted data) to be written into the respective cells thereby refreshing and inverting the data on each cell in the addressed column. The data is inverted on the storage node only during a write cycle, in this case the write portion of the refresh cycle. Until then, the stored data is unaffected.

Since during each read cycle each data line is precharged by source V, the resulting voltage present on each data line after the read cycle is relatively high. This relatively high voltage may then be written into the cells thus refreshing the data on the storage nodes as described above without the necessity for a refresh amplifier.

Because each write cycle and refresh cycle inverts the data on the cells in the addressed column, it is necessary to keep track of whether or not the data on the cells in a particular column is inverted or not. The knowledge of whether the data on the cells in a particular column is inverted or not will determine the output from a cell in that column during a read operation is inverted in input-output buffer 54. In a similar manner, whether or not the data is inverted on the cells in a particular column will determine whether input data will be inverted in input-output buffer 54 before it is written into one of the cells in that column. Proper functioning of the memory is possible as long as some means are provided for keeping track of whether or not the data is inverted on the cells in a particular column at a given instant.

Methods for keeping track of whether or not the data is inverted in a particular column are state-of-the art and the particular method utilized herein forms no portion of the present invention. A good explanation of such a method is found in a paper presented at the 1972 IEEE International Solid-State Circuits Conference by W. Martino and B. F. Croxon entitled "The Inverting Cell Concept For MOS Dynamic RAMS."

Figure 3:
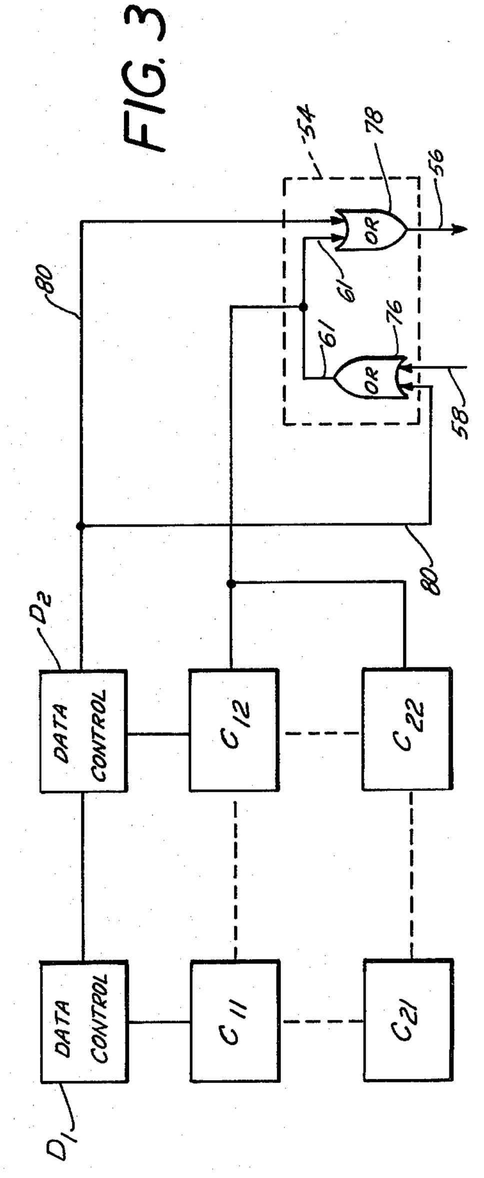
FIG. 3 shows a schematic diagram of a method for determining the status of each column of the memory.

In order to more fully understand the operation of the present invention, this method of keeping track of the current status of a particular column, i.e., whether the data in the column is inverted or not, is described functionally with reference to FIG. 3. A data control cell designated generally as $D_Y$ is associated with each column of memory cells. Therefore, in this case, two data control cells $D_1$ and $D_2$ are associated with columns 1 and 2 respectively. Each of the data control cells $D_1$ and $D_2$ is functionally connected with input-output buffer 54 by line 80. Buffer 54 comprises (in addition to the input-output circuitry not shown) a pair of exclusive OR gates 76 and 78. Exclusive OR gate 76 has two inputs, one of which is data input line 58 and the other of which is line 80, which is connected to the data control cells. The output of gate 76 is line 61. Exclusive OR gate 78 has two inputs, one of which is line 61 and the other of which is line 80 which is operably connected to the data control cells, and an output which is data output line 56. The data control cell associated with each column has a logic state which reflects whether or not the data on the column associated therewith is inverted. When data from a cell in a particular column is to be read out, the data appears on line 61, as described above, which is connected to exclusive OR gate 78. The other input of exclusive Or gate 78 is connected to the data control cell associated with the addressed column through line 80. If the data which is present on line 61 is inverted, the signal from the data control cell reflects this and OR gate 78 inverts the data once again such that the signal which appears on line 56 is the noninverted data. On the other hand, if the data on line 61 is not inverted, OR gate 78 does not invert the data and the data on line 61 appears on line 56.

For write operations the identical functional method is utilized. The data appears on data input line 58. If the data on the data storage nodes associated with each of the cells in the addressed column is inverted, this status is refleced by the data control cell associated with the addressed column and the appropriate signal appears on line 80 such that the data from line 58 is inverted before it is transferred to line 61 and thus written into the addressed cell. In this manner, the data control cells keep track of the current status of each column of the memory such that incoming and outgoing data are appropriately acted upon such that the data is compatible with the remainder of the data in the addressed column.

One additional aspect of the operation of the circuit of the present invention must be considered. Assume that during a read operation, all of the cells in the addressed row have positive charges on their storage nodes. When the transistor 18 in the addressed cell is rendered conductive, thereby connecting the data input-output line of the addressed row to ground, the transitor 18 in the addressed cell must not only discharge the capacitance of the addressed row but also the capacitance for each of the read lines in the nonaddressed columns. This situation does not adversely affect the proper functioning of the circuit but does create a limiting factor for the speed of the circuit.

The system of the present invention provides data control for a dynamic random access memory comprising two device memory cells which does not necessitate refresh amplifiers. This is accomplished by precharging each of the data input-output lines during $\phi_1$ time by connecting them to source V. By grounding the read line in the addressed column, a relatively high voltage signal, which reflects the data present on each cell of the addressed column, but is the inversion thereof, appears on the respective data input-output lines. During the write cycle, this inverted data is written into each of the cells in the addressed column. In this way, the stored data is inverted and refreshed. As long as a refresh cycle occurs for each column periodically in periods less than the decay time of the storage nodes, the data will be preserved on the memory cells without the necessity of a refresh amplifier. This data control system, therefore, has the advantage of being relatively simple and can function effectively to retain the data on memory cells of the dynamic type without the necessity of refresh amplifiers. The elimination of refresh amplifiers, one of which is normally necessary for each column in a memory, and the minimization of the number of conductors not only simplfies the circuit but saves a considerable amount of space thus permitting the memory to have a higher capacity per unit area.

A single embodiment of the present invention has been disclosed herein for purposes of illustration. It is obvious that many modifications and variations can be made therein. It is intended to cover all of these modifications and variations which are included within the scope of the appended claims.

I claim:

1. A method for controlling data flow into a two device memory cell wherein each of the devices have a control terminal and an output circuit, a first command line operably connected to the control terminal of the first device, a storage node, a single data input-output line, the output circuit of the first device being connected between said data line and said node, a second command line, the second device having its output circuit connected between said data line and said second command line and its control terminal connected to said node, the method comprising the steps of charging the node to a discrete logic level, precharging the data line to a first voltage level, charging the second command line to a second voltage level, the second device being effective, if rendered conductive by the charge on the storage node, to change the voltage level of the data line to the second voltage level such that the resulting voltage level on the data line is representative of the charge on the storage node.

2. The method of claim 1 further comprising the steps of charging the data line to a logic level representative of the data to be stored in the cell and charging the first command line to the first voltage level such that said first device is rendered conductive to charge the storage node to the logic level present on the data line.

3. The method of claim 2 wherein the step of charging the data line comprises retaining the resulting voltage level on the data line.

4. The method of claim 2 wherein the step of charging the data line comprises connecting the data line to the input of the memory.

5. A method for controlling data flow in a memory having a plurality of two device memory cells arranged in a row by column matrix, each row being associated with a single data input-output flow line and each column being associated with first and second command lines, each cell having a first device with a control terminal connected to the first command line associated with the cell, a storage node, the output circuit of the first device connected between the data line associated with the cell and the storage node, the output circuit of the second device connected between the data associated with the cell and the second command line associated with the cell and the control terminal thereof connected to the storage node, the method comprising the steps of charging the storage node to a discrete logic level, precharging each of the data lines to a first given voltage level, selecting the column of the cell to be addressed, charging the second command line in the addressed column to a second voltage level such that the second device in each cell in the addressed column is effective, if rendered conductive by the storage node connected thereto, to charge the voltage level of the data line of the row in which the cell is present to the second voltage level thereby causing the resulting voltage level on each data line to be representative of the logic level of the storage node of each cell respectively in the addressed column.

6. The method of claim 5 further comprising the steps of charging the data line in the addressed row to a voltage level representative of the data to be stored on the addressed cell and charging the first command line in the addressed column to the first voltage level such that the first device in each cell of the addressed column is effective to charge the storage node of that cell to the voltage level present on the data line associated with that cell.

7. The method of claim 6 wherein the step of charging the data line comprises retaining the voltage level on the data lines in the nonaddressed rows.

8. The method of claim 7 wherein the step of charging the data line comprises connecting the data line of the addressed row to the input of the memory.

9. The method of claim 6 wherein the step of charging the data line comprises retaining the resulting voltage on each row of the memory.

10. A data flow control system for a memory of the type having a two device memory cell comprising a first command line, a second command line and a single data flow line, the control terminal on the first device being operably connected to said first command line, the output circuit of the first device being operably connected between said data line and the storage node of the cell, the storage node being operably connected to the control terminal of the second device and the output circuit of the second device being operably connected between said data line and said second command line, means for charging the storage node to a discrete logic level, means for precharging said data line to a first voltage level, means for charging said second command line to a second voltage level, said first and second voltage levels having a voltage level difference sufficient to render the second device conductive if the storage node is at a given logic level thereby causing the voltage level of the data line to change to the second voltage level.

11. The system of claim 10 further comprising means for charging said first command line to said first voltage level thereby rendering the first device conductive and causing the storage node to assume the logic level of said data line.

12. The system of claim 10 wherein said precharging means is always actuated before said second command line charging means.

13. The system of claim 11 wherein said second command line charging means is always actuated before said first command line actuating means.

14. The system of claim 10 further comprising means for charging said data line in accordance with the data input of the circuit, said data line charging means being effective to overpower any voltage level present on said data line prior to the actuation thereof.

15. The system of claim 10 further comprising means for sensing the logic level on said data line after said second command line has been actuated.

16. A system for controlling data flow in a memory having a plurality of two device memory cells arranged in a row and column matrix array comprising a single data flow line associated with each row of cells and a first and a second command line associated with each column of cell, the first device in each cell having a control terminal operably connected to said first command line of the column in which the cell is situated and an output circuitry operably connected between said data line in the row in which the cell is situated and the storage node of the cell, the control terminal of the second device of each cell being operably connected to the storage node of that cell and the output circuit of the second device being operably connected between the data line of the row in which the cell is situated and said second command line of the column in which the cell is situated, means for charging each storage node to a discrete logic level, means for precharging each of said data lines to a first voltage level, means for charging said second comnand line of the addressed column to a second voltage level, said first and second voltage levels having a voltage level difference sufficient to render conductive the second device of each cell in the addressed column if the storage node associated therewith is at a given logic level thereby causing the resulting voltage level on each of said data lines to be representative of the logic level of the respective storage nodes in the addressed column.

17. The system of claim 16 further comprising means for charging said data line of the addressed row in accordance with the logic level to be stored in the addressed cell and charging said first command line in the addressed column to said first voltage level thus rendering conductive the first device in each cell in the addressed column such that the logic level present on each data line is assumed by the storage node on each cell in the addressed column.

18. The system of claim 17 wherein the resulting voltage level is retained on the data lines in the nonaddressed row.

19. The system of claim 18 further comprising means for connecting said data line charging means with the data input of the memory.

20. The system of claim 17 wherein the resulting voltage level is retained on all the data lines in each row of the memory.

* * * * *